Feb. 5, 1957 W. L. GOVAN 2,780,092
TUBE TESTING DEVICE
Filed Nov. 12, 1953 3 Sheets-Sheet 1

INVENTOR.
WILLIAM L. GOVAN.
BY
AGENT

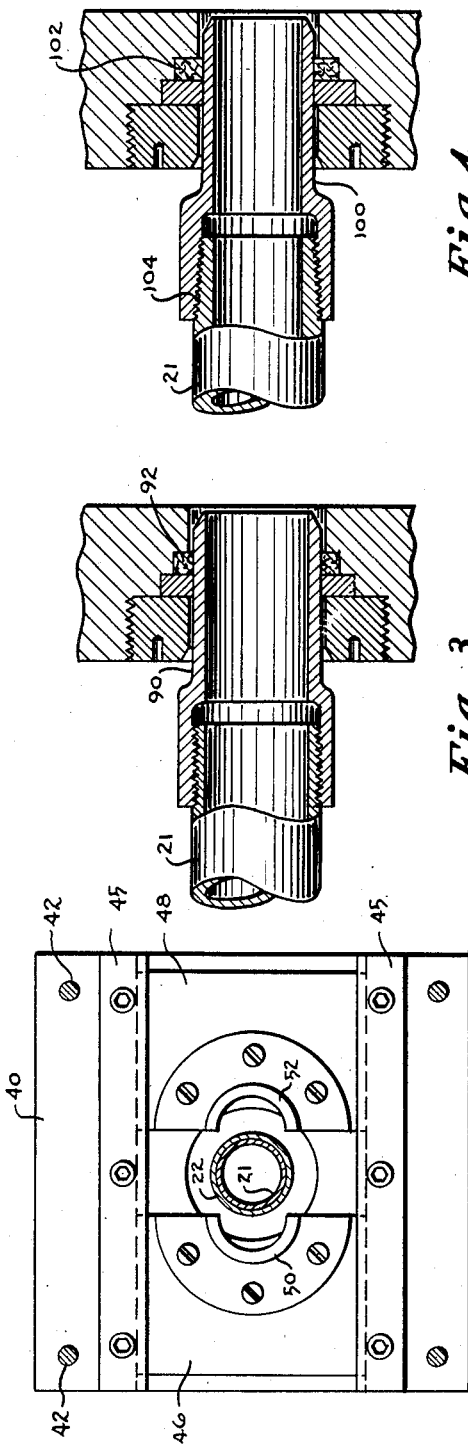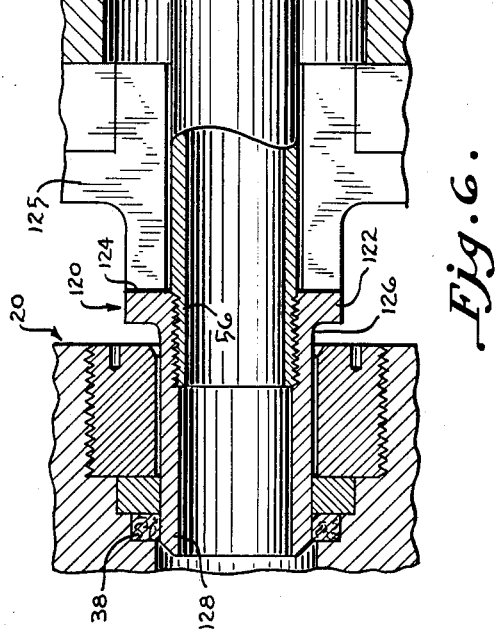

Feb. 5, 1957  W. L. GOVAN  2,780,092
TUBE TESTING DEVICE
Filed Nov. 12, 1953  3 Sheets-Sheet 3

INVENTOR.
WILLIAM L. GOVAN.
BY
AGENT

United States Patent Office 2,780,092
Patented Feb. 5, 1957

2,780,092

TUBE TESTING DEVICE

William L. Govan, Port Washington, N. Y., assignor, by mesne assignments, to Baldwin-Lima-Hamilton Corporation, Philadelphia, Pa., a corporation of Pennsylvania Application November 12, 1953, Serial No. 391,476

8 Claims. (Cl. 73—49.5)

This invention relates to hydraulic tube testing machines for testing tubes, pipes, or like, under internal hydraulic pressure, in particular under high pressures in the range from about 3000 to 10,000 p. s. i.

In machines of the above type, tubes are subjected to circumferential tensile or hoop stresses approaching the neighborhood of the yield point to test their resistance to bursting pressure while also examining their fluid tightness. At the same time, however, longitudinal compressive loads are often applied to the tubes in conventional tube testing machines, which may cause failure of tubes of relatively small diameter or wall thickness due to buckling. This is true particularly in the case of testing machines having sealing means which engage the tubes on their outer diameter so that the test pressure acts on the ends of the tube, resulting in an axial compressive load which is equal to the test pressure times the annular area at the tube end.

Frequently tubes are tested with a standard coupling tightly screwed onto one end thereof, one of the seals engaging the outer diameter of the coupling while the other seal engages the outer diameter of the tube at the other end thereof. To take up the thrust exerted by the test pressure against the free front face of the coupling and to prevent axial shifting of the coupling and tube due to such thrust, the coupling is anchored in the machine by a locking device which engages the rear face of the coupling. Here again the tube is subjected to buckling stresses proportional to the annular area at the end of the tube. Furthermore, the bearing area of the face of the coupling engaging the locking device is sometimes not sufficient to withstand the axial thrust exerted against the coupling by the test pressure.

Tubes have further been tested with a standard coupling tightly screwed onto each of the ends, but in the conventional arrangement this results in a high buckling load due to the large area against which the test pressure acts at the ends of the tube.

If tubes are tested without couplings thereon, buckling stresses can be avoided by using internal seals or packings engaging the bore of the tube so that no fluid pressure will act on the ends of the tube. However, the inner wall of the tube is relatively rough so that this arrangement increases wear of the sealing material. When testing tubes with standard couplings thereon, it is not possible to use an internal seal in the coupling because the latter is threaded internally at its ends.

Rapid wear of sealing material has also been encountered with seals engaging the outer periphery of the tube since the outer surface, though smoother than the inner wall, is still not satisfactory for sealing purposes.

Various attempts have been made to avoid such drawbacks, and in particular to control longitudinal stresses in the tube during testing, but the previous arrangements do not satisfy all requirements. For example, one threaded end of the tube has been anchored in the machine and the other threaded end completely closed by a cap or the like in a manner such that the tube can elongate freely in its axial direction. This will eliminate buckling stresses, but an axial tensile load is produced equal to the test pressure times the area corresponding to the inside diameter of the pipe. Such relatively high axial load is not always desirable and in certain cases may exceed the amount the tube can safely withstand, especially at the threads.

In another arrangement, packing glands have been connected to the ends of the tube by means of hydraulic cylinders and gripping elements to produce tensile stresses in the tube. In a further arrangement, both ends of the tube have been provided with couplings and anchored in the machine, and cylinders and pistons have been used to produce longitudinal compression, longitudinal tension, or a neutral longitudinal stress condition in the tube. These arrangements are relatively complicated and require machines of special construction.

It is an object of the present invention to provide simple and inexpensive means for controlling or eliminating longitudinal stresses in a tube to be tested under internal hydraulic pressure.

It is another object of the invention to provide improved testing means which can easily be applied to a tube testing machine of conventional construction.

It is a further object of the invention to provide simple means for varying the bearing pressure encountered at the coupling locking device of a tube testing machine.

It is a still further object of the invention to provide simple means for reducing the wear of seals in tube testing machines.

The invention includes the use of adaptor means which can easily be applied to the tube to be tested, the testing machine being provided with sealing means dimensioned to cooperate with said adaptor means.

Further objects, features and advantages of the invention will become apparent from the following description.

In the drawings:

Fig. 2 is a sectional view on a reduced scale generally taken along line 2—2 of Fig. 1, but showing certain parts in a different position.

Figs. 3 to 6 are fragmentary sectional views illustrating various shapes of adaptors according to the invention.

Figure 1:
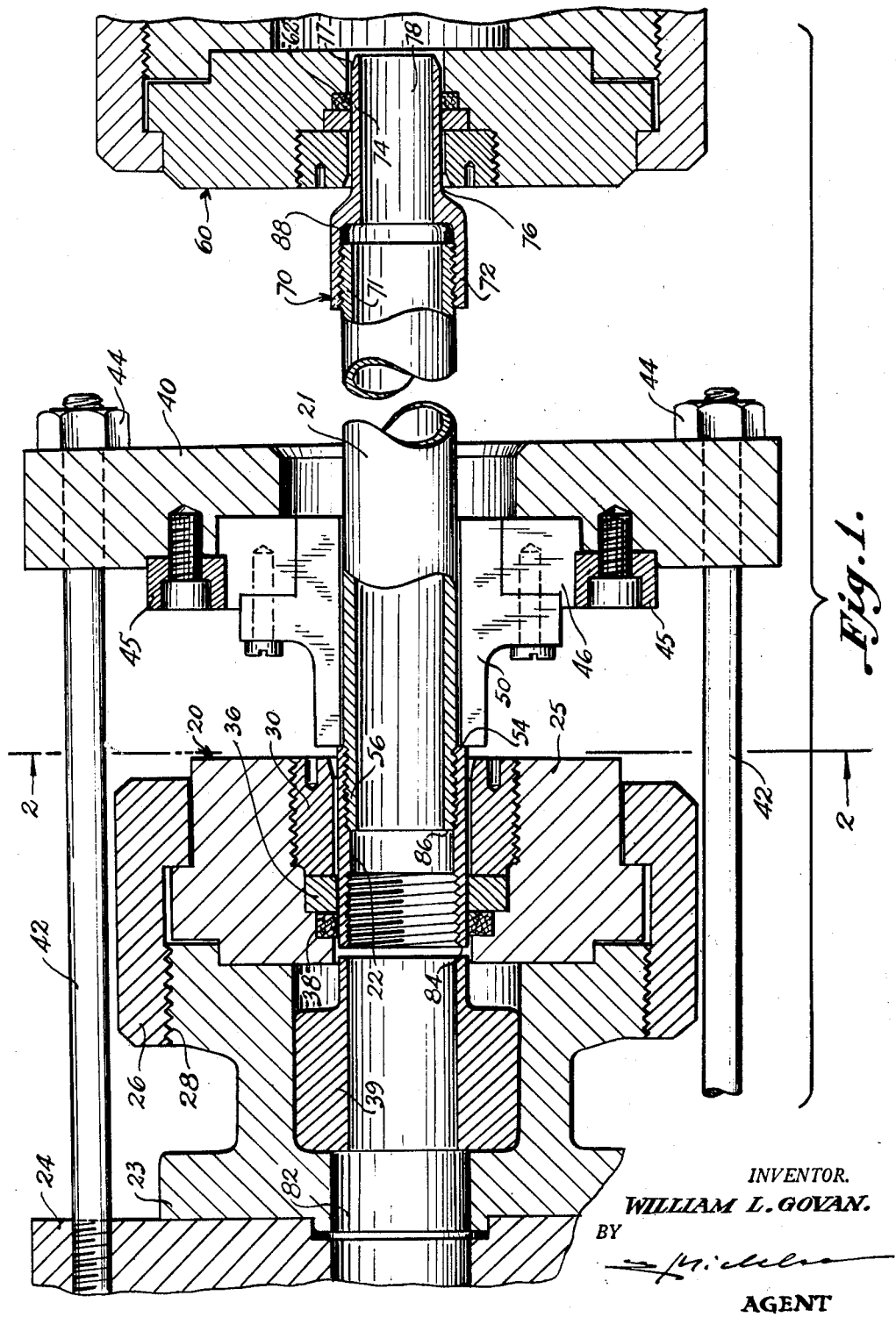
Fig. 1 is a diagrammatic sectional view showing one form of the invention.

Referring to the drawings, Figs. 1 and 2 illustrate the application of the invention to a machine which is provided with a coupling locking device for testing a tube with a coupling tightly screwed onto one of the threaded ends thereof.

A test head assembly 20 serves to support tube 21 at the end carrying standard coupling 22. Body 23 of the test head is mounted on a support 24 by screws (not shown) and carries a packing holder 25 held in place by a nut 26 engaging threads 28 of body 23. A packing retainer or nut 30 is screwed into packing holder 25 to engage a back-up ring 36 which bears against a packing ring or seal 38. By changing the packing holder 25, as well as a spacer element 39, the head can easily be adapted to various pipe sizes to be tested.

The coupling locking device which is shown in closed position in Fig. 1 and in open position in Fig. 2 comprises a plate or crosshead 40 attached to support 24 by means of studs 42 and nuts 44. Guided on crosshead 40 by means of gibs 45 are a pair of slides 46, 48 (Fig. 2) carrying the two halves 50, 52 of a split locking sleeve. The latter is arranged to engage rear face 54 of the standard coupling 22 tightly screwed onto threaded end 56 of tube 21. By changing parts 50, 52, the locking device may readily be adapted to various sizes of tubes to be tested.

A second test head assembly 60 which serves to support the other end of tube 21 is axially aligned with and generally similar to test head 20 but is not provided with a coupling locking device and has a packing ring or seal 62 which differs in size from seal 38. In an arrangement of conventional type, the seal of test head 60 would engage the outer diameter of tube 21 resulting in a certain buckling stress in the tube and a certain bearing pressure at the locking device, frequently exceeding the allowable limits.

According to the invention, an adaptor generally indicated at 70 is tightly screwed onto threaded end 71 of tube 21 so that the adapter is movable into and out of the testing machine together with the tube as a unit. This adaptor comprises a tubular mounting portion 72 which is threaded internally, and a tubular sealing portion 74 which has an external cylindrical, preferably machined or polished sealing surface 76. Seal 62 is dimensioned so that its internal diameter is substantially equal to the outer diameter of surface 76, and the seal encloses the cylindrical sealing surface. Chamfer 77 at the end of the adaptor serves to facilitate introduction of the adaptor into the test head. The adaptor 70 is preferably longer than standard coupling 22 since this has been found most suitable. A passage 78 extends through the entire adaptor to allow free passage of fluid therethrough.

Mounting portion 72 which accommodates the same size of thread as coupling 22, will normally have an outer diameter similar to or exceeding that of coupling 22. The diameter of adaptor surface 76 which is smaller than the outer diameter of mounting portion 72 and also smaller than the outer diameter of the coupling, is selected so as to obtain desired stress conditions in the tube to be tested as will be set forth after describing the operation of the machine.

When starting a testing cycle, the coupling locking device is in open position so that parts 50, 52 allow free passage of coupling 22 therebetween. The test heads 20, 60 which are moveable relative to each other by conventional means (not shown) will be positioned at a distance such that a tube may easily be placed in the space between the heads. Thereafter, the heads are moved towards each other so that as shown in Fig. 1 seal 38 engages coupling 22 while seal 62 engages sealing surface 76 of adaptor 70, spacer 39 serving as a stop to prevent the coupling and tube from being pushed too far into test head 20. The coupling locking device is then moved from the open position shown in Fig. 2 into the closed position according to Fig. 1 in which parts 50, 52 of the locking sleeve abut each other and engage rear face 54 of the coupling.

Opening 82 in body 23 serves to fill the tube with water and thereafter to introduce high pressure water into the tube in conventional manner. It will be clear that the interior of the tube communicates with the sealing areas at seals 38 and 62 through the bore of coupling 22 and through passage 78 of the adaptor, respectively.

The thrust exerted by high pressure water in the axial diection of the tube is proportional to the annular area lying between seals 38 and 62, that is, between the outer diameter of coupling 22 and the diameter of surface 76 of the adaptor. This thrust is taken up by the coupling locking device which holds end 56 of the tube in a fixed position whereas the other end 71 is free to move axially in response to stress conditions in the tube. After testing, the locking device will be opened and the test heads moved away from each other so that the tube is released.

According to Fig. 1, the diameter of sealing surface 76 of the adaptor is equal to the internal diameter of tube 21. With this arrangement, the coupling locking device will take up the thrust of high pressure water not only against annular face 84 of coupling 22 but also against annular face 86 of tube 21. At the other end of the machine, water pressure against annular face 88 of the tube and against the corresponding opposite area of adaptor 70 will bear upon these parts in opposite directions, resulting in stress in the threaded end 71 of tube 21 without affecting other portions of the tube. Apart from its threaded ends, therefore, the tube will be free of longitudinal stress so that the conditions are similar to those obtained with conventional internal diameter seals. In this respect, it can be said that with the aid of the adaptor the internal seal is converted into an outer seal of the same diameter. As compared with the conventional arrangement, this is of great advantage since the conventional internal seal engages the inner diameter of the tube which is relatively rough and causes extreme wear of the sealing material. Further, an outer seal is sometimes preferable to keep the internal fluid passage as large as possible.

By using modified adaptors having smaller or larger diameters at the sealing surface and mounting the same on the free end 71 of the tube, various desired stress conditions can be obtained. For example, Fig. 3 shows an adaptor in which the diameter of sealing surface 90 is equal to the outer diameter of tube 21, a seal 92 of corresponding size being provided. In this case, only the thrust against face 84 of standard coupling 22 (see Fig. 1) will be taken up by the coupling locking device and the tube will be subjected to a longitudinal compressive load corresponding to the thrust against the ends of the tube. This arrangement will be used when the resulting buckling stress in the tube is not dangerous and it is desired to decrease the bearing pressure at the coupling locking device as compared with the bearing pressure caused by the adaptor 70 of Fig. 1. The stress conditions are now the same as if seal 92 would engage the outer diameter of the tube but contact between seal 92 and the outer periphery of the tube is avoided. Although the outside of the tube is generally somewhat smoother than its inner wall, it is by far not as suitable for sealing purposes as surface 90 of the adaptor which can easily be machined or polished. Therefore, this arrangement will reduce wear of sealing material as compared with an external seal engaging the tube.

If a further increase in compressive load on the tube is allowable and a further decrease in bearing load at the coupling locking device is required, the diameter of the sealing surface of the adaptor may have a size intermediate the outer diameter of tube 21 and the outer diameter of standard coupling 22, without reaching the latter diameter as it will not be necessary to relieve the bearing pressure entirely. Therefore, the diameter of the sealing surface of the adaptor will remain smaller than the outer diameter of coupling 22 and thus smaller than the outer diameter of the mounting portion of the adaptor which is normally at least equal to the outer diameter of the coupling.

If the compressive load on the tube is to be decreased as compared with Fig. 3, without increasing the bearing pressure at the locking device to a degree corresponding to the Fig. 1 arrangement, the sealing diameter of the adaptor may have a size intermediate the outer and inner diameters of tube 21. This is shown in Fig. 4 in which the sealing surface of the adaptor is indicated at 100 and the cooperating seal at 102. Adaptor and tube may have conventional tapered thread as indicated at 104. Bearing pressure at the coupling locking device will be proportional to the annular area lying between the internal diameters of seal 38 (Fig. 1) and seal 102 while the compressive or buckling stress in the tube will be proportional to the annular area lying between the internal diameters of seal 102 and tube 21.

In case the tube is to be tested under longitudinal tension, the adaptor may be shaped as shown in Fig. 5, in which the diameters of sealing surface 110 and seal 112 are smaller than the internal diameter of the tube. The tensile load is proportional to the annular area lying between the internal diameter of tube 21 and the diameter of sealing surface 110. By selecting a suitable diameter of surface 110, the desired tensile stress may be obtained. The thrust at the coupling locking device will be proportional to the annular area lying between the internal diameters of seals 38 (Fig. 1) and 112.

In the embodiments described hereinbefore, a standard coupling is screwed permanently onto one end of the tube before testing, and when a coupling is required, this is normally preferable to using a special device which must be replaced by such coupling after the test. In certain cases, however, it is of advantage to use adaptors on both ends of the tube, in particular if it is desired to reduce the buckling stress in the tube as well as the bearing pressure at the locking device.

Fig. 6 shows an embodiment of the last-mentioned type, in which the fixed end 56 of tube 21 is provided with an adaptor generally indicated at 120. The latter has a tubular mounting portion 122 of increased diameter so that the enlarged face 124 thereof will be subjected to a reduced unit bearing pressure at the locking device as compared with Fig. 1. Split sleeve 125 is of a length such as to accommodate mounting portion 122 between locking device and test head. The diameter of surface 126 of tubular sealing portion 128 is equal to the outer diameter of standard coupling 22 (Fig. 1) so that seal 38 of test head 20 will remain unchanged. This arrangement is suitable particularly when the other end of the tube is provided with an adaptor of the shape shown in Fig. 5 for testing tube 21 under longitudinal tension since the relatively large area of face 124 will assist in taking up the added bearing pressure caused by the tensile load.

Figure 7:
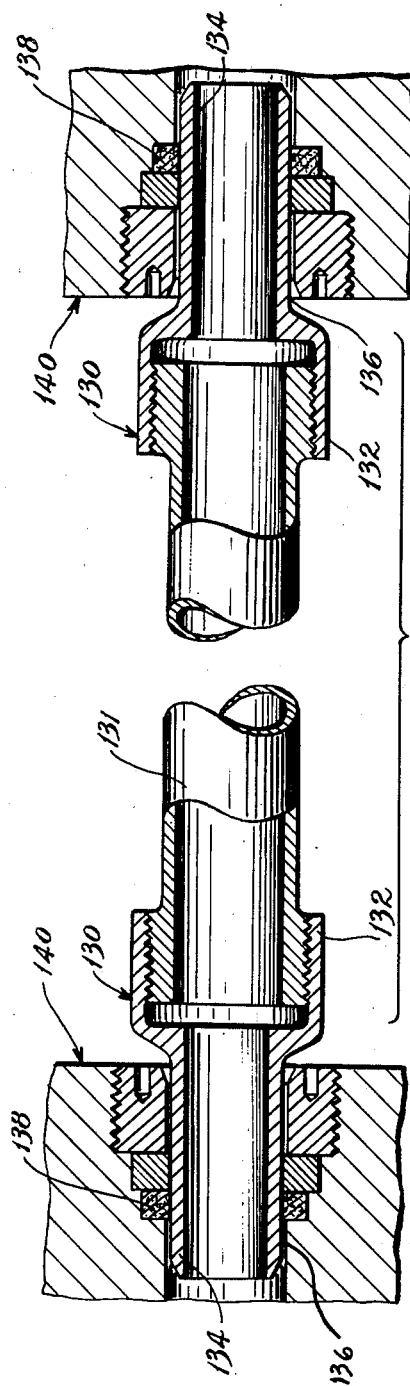
Fig. 7 is a diagrammatic sectional view showing a modified form of the invention.

Whereas in all the foregoing embodiments the two seals adjacent the tube ends differ in diameter resulting in axial thrust exerted on the tube and taken up by a locking device, the invention may also be applied to certain ararngements in which the two seals are of the same diameter. For example, Fig. 7 shows the testing of a tube having identical adaptors generally indicated at 130 and tightly screwed onto its ends. At the same time, this embodiment illustrates the application of the invention to an upset tube 131. A decrease in or elimination of the compressive stress is of particular importance in this case because of the increased load which would normally result from the large areas at the upset tube ends.

Each of the adaptors 130 comprises a tubular mounting portion 132 and a tubular sealing portion 134 of smaller diameter. Surface 136 of each sealing portion 134 cooperates with a seal 138 mounted in a test head assembly 140. The diameter of each sealing surface 136 is equal to the internal diameter of tube 131 so that the tube will be free of longitudinal stresses, except at the threads. By varying the sealing diameter, various stress conditions may be obtained as described hereinbefore. If the sealing diameter is smaller than the internal diameter of the tube, longitudinal tension will be obtained in this form of the invention without using a locking device.

Figure 8:
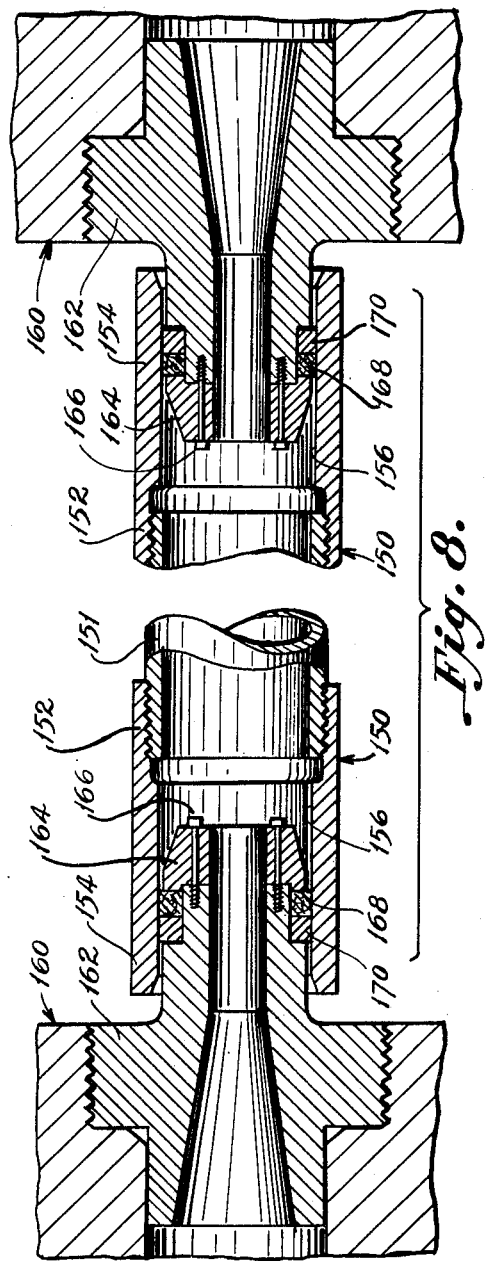
Fig. 8 is a diagrammatic sectional view illustrating a further modification of the invention.

A further modification of the invention embodying the use of internal seals is shown in Fig. 8, according to which an adaptor generally indicated at 150 is tightly screwed onto each end of tube 151. Each adaptor comprises a tubular mounting portion 152 and a tubular sealing portion 154 which may be of equal outer diameter. Portion 154 is provided with an internal sealing surface 156 which is preferably machined or polished. Test head assembly 160 includes a plug 162 carrying a cover 164 which is removably mounted by means of screws 166. Packing ring 168 and back-up ring 170 are held in place on plug 162 by cover 164.

The diameter of each sealing surface 156 is equal to the internal diameter of tube 151 so that the tube will be free of longitudinal stress, except at the threads. By modifying the diameter of sealing surfaces 156, various stress conditions may be obtained. For example, it may be desirable to increase the sealing diameter somewhat with a view to obtaining a larger passage for pressure water while admitting a limited buckling stress in the tube. Since both internal seals cooperate with the adaptors, contact between the relatively rough internal wall of the tube and the packing material is entirely eliminated so that undue wear of packings will be avoided.

A further advantage of the use of adaptors in internal sealing arrangements is due to the fact that in standard tubes, only the outer diameter is constant for a certain tube size whereas the internal diameter is determined in accordance with the desired wall thickness. Therefore, a large number of plugs and packings of different sizes has been required heretofore to take care of various internal diameters so that internal sealing arrangements have often been impractical. When providing adaptors in accordance with the invention, the diameter of the internal seals may be kept constant for a certain tube size as far as permitted by stress conditions in the tube. Thus, the use of adaptors will result in a substantial reduction in the number of required sizes of internal seals.

As mentioned hereinbefore, changes in length of the tube may occur in response to stress conditions during testing. To eliminate corresponding movements at the seals under pressure and avoid resulting high wear of the packing material, compensating devices have been arranged as described, for example, in copending application Serial No. 158,098, filed April 26, 1950, now Patent No. 2,671,339. Since the adaptor according to the invention may be provided with a properly prepared, smooth sealing surface, slight relative motion between seal and adaptor during testing will not be detrimental so that a compensating device of the above type may not be required. However, such compensating device may still be incorporated in the machine if desired to avoid any relative sliding motion between sealing surface and packing material under high pressure.

It will be clear that the adaptor according to the invention can easily be used in existing tube testing machines since it will only be necessary to provide sealing means of corresponding diameter. By selecting an adaptor of suitable dimensions, the diameter of the sealing means can be determined so as to obtain desired stress conditions in the tube to be tested. It will be apparent that buckling stress in the tube can be varied from zero to the test pressure times the full annular area at the tube ends, or larger areas when testing the tube with a coupling thereon, for example. Tensile stress in the tube can be varied from zero to desired values within practical limits. Bearing load at locking devices of the type describe can be varied from values approaching zero to the maximum resulting from maximum tensile load on the tube.

While particular embodiments of the invention have been described in detail and illustrated in the accompanying drawings, it is to be understood that these embodiments are merely exemplary and the invention is not limited thereto, and that various changes and modifications may be effected therein without departing from the scope of the invention as defined in the claims appended hereto.

Wherever the term "tube" is used in the description and appended claims, it is to be understood as including pipes and similar tubular articles.

Having described my invention, what I claim and desire to secure by Letters Patent is:

1. In a hydraulic tube testing machine in which fluid under pressure is supplied to the interior of a tube to be tested and which includes head means cooperating with the ends of said tube, said ends being threaded, a device comprising adaptor means on at least one end of said tube and movable into and out of the testing machine together with said tube as a unit, said adaptor means including a threaded tubular mounting portion tightly screwed onto said one end of the tube and a tubular sealing portion having a cylindrical sealing surface of a diameter smaller than the outer diameter of said tubular mounting portion, and sealing means carried by said head means and spaced from said tube so as to engage the cylindrical sealing surface of said adaptor means and seal the adaptor means and said one end of the tube connected thereto.

2. A device as specified in claim 1, in which the diameter of said sealing surface is substantially equal to the internal diameter of the tube to be tested.

3. A device as specified in claim 1, in which said sealing surface is positioned on the outside of said adaptor means and extends through said sealing means.

4. A device as specified in claim 1, in which said sealing surface is positioned in the interior of said adaptor means and encloses said sealing means.

5. In a hydraulic tube testing machine in which fluid under pressure is supplied to the interior of a tube to be tested, the ends of said tube being threaded, a coupling being tightly screwed onto one of said ends, the combination comprising a first head cooperating with said one end of the tube, coupling locking means on the first head for preventing axial movement of the coupling and tube relative to said head during testing, sealing means on the first head engaging said coupling, a second head cooperating with the other end of the tube, an adaptor including a threaded tubular mounting portion tightly screwed onto said other end of the tube and further including a tubular sealing portion extending form said mounting portion and having a cylindrical sealing surface of a diameter smaller than the outer diameter of said tubular mounting portion, and sealing means carried by said second head and spaced from said tube so as to engage the cylindrical sealing surface of said adaptor and seal the adaptor and said other end of the tube connected thereto.

6. In a hydraulic tube testing machine in which fluid under pressure is supplied to the interior of a tube to be tested, said tube having threaded ends, the combination comprising a first head cooperating with one of the ends of said tube, a first adaptor having a threaded tubular mounting portion tightly screwed onto said one end of the tube, locking means on said first head for engaging said first adaptor and preventing axial movement of the adaptor and tube relative to said head during testing, a second head cooperating with the other end of the tube, a second adaptor having a threaded tubular mounting portion tightly screwed onto said other end of the tube, each of said adaptors having a tubular sealing portion extending from its mounting portion and provided with a cylindrical sealing surface of a diameter smaller than the outer diameter of said tubular mounting portion, and sealing means carried by said first and second heads and spaced from said tube so as to engage the cylindrical sealing surfaces of said adaptors and seal the adaptors and the ends of the tube connected thereto.

7. In a hydraulic tube testing machine in which fluid under pressure is supplied to the interior of a tube to be tested, said tube having threaded ends, the combination comprising a pair of heads cooperating with the ends of said tube, a pair of adaptors movable into and out of the testing machine together with said tube as a unit, each of said adaptors including a threaded tubular mounting portion tightly screwed onto one end of said tube and further including a tubular sealing portion having a cylindrical sealing surface of a diameter smaller than the outer diameter of the associated tubular mounting portion, and sealing means positioned on each of said heads and spaced from said tube so as to engage the cylindrical sealing surfaces of said adaptors and seal the adaptors and the ends of the tube connected thereto.

8. The combination as specified in claim 7, in which the sealing surfaces of said adaptors have equal diameters.

References Cited in the file of this patent

UNITED STATES PATENTS

| | | |
|---|---|---|
| 715,423 | Ryan | Dec. 9, 1902 |
| 2,155,602 | Keulers | Apr. 25, 1939 |
| 2,445,876 | Fullerton | July 27, 1948 |
| 2,633,739 | Potts et al. | Apr. 7, 1953 |
| 2,655,182 | Hayes | Oct. 13, 1953 |
| 2,664,271 | Arutunoff | Dec. 29, 1953 |
| 2,671,339 | Krause et al. | Mar. 9, 1954 |

FOREIGN PATENTS

| | | |
|---|---|---|
| 319,889 | British | Oct. 3, 1929 |